United States Patent [19]
Boiarski et al.

[11] Patent Number: 5,706,663
[45] Date of Patent: Jan. 13, 1998

[54] HIGH EFFICIENCY THROTTLE CRYOGENIC REFRIGERATOR BASED ON ONE STAGE COMPRESSOR

[75] Inventors: Mikhail Boiarski; Boris V. Yudin, both of Moscow Region, Russian Federation; Ralph C. Longsworth; Ajay N. Khatri, both of Allentown, Pa.

[73] Assignee: APD Cryogenics, Inc., Allentown, Pa.

[21] Appl. No.: 560,719

[22] Filed: Nov. 20, 1995

[51] Int. Cl.$^6$ ............................................. F17C 11/00
[52] U.S. Cl. ........................... 62/114; 62/46.1; 252/67
[58] Field of Search ...................... 62/51.2, 114, 46.1; 252/67

[56] References Cited

U.S. PATENT DOCUMENTS 5,063,747  11/1991  Jones et al. .................................. 62/461
5,337,572  8/1994   Longsworth ................................. 62/51.2

FOREIGN PATENT DOCUMENTS 1336892  11/1973  United Kingdom.

OTHER PUBLICATIONS

R. Longsworth, et al., "80 K Closed Cycle Throttle Refrigerator", International Cryocooler Conf., Jun. 1994.

*Primary Examiner*—William Doerrler
*Attorney, Agent, or Firm*—Helfgott & Karas, P.C.

[57] ABSTRACT

Mixed refrigerants provide refrigeration at cryogenic temperatures with throttling cycles operating with a one-stage compressor. The refrigerants include noncondensable gases such as helium, neon, or hydrogen to increase the overall cooling capacity of a refrigeration system at the same refrigeration temperature which is attainable without such noncondensable gases. More refrigeration can be produced with existing systems at temperatures above the normal boiling point of nitrogen or argon by adding, for example, helium, than for refrigerant blends without helium. By increasing the return pressure value of the refrigeration cycle in relation to the molar percent of helium present in the refrigerant, a constant refrigeration temperature may be maintained which exhibits greater stability than prior systems operating at the same temperature without helium enrichment.

3 Claims, 5 Drawing Sheets

HIGH EFFICIENCY THROTTLE CRYOGENIC REFRIGERATOR BASED ON ONE STAGE COMPRESSOR

BACKGROUND OF THE INVENTION

1. Field of the Invention

The present invention relates generally to cryogenic cooling and in particular to increasing the cooling capacity of a conventional throttle cycle refrigerator (or Joule-Thomson refrigerator). The invention involves a specialized refrigerant blend used in combination with an increase in the return pressure to the compressor, as compared to the lower return pressure of conventional systems using known refrigerant blends.

2. Description of Prior Developments

Throttling cryogenic cycles using a blend of refrigerants generally referred to as "mixed gas refrigerant" or "MR" are well known and have been described in many references. The supply pressure, Ph, of these cycles is generally lower than the supply pressure associated with cryogenic cycles operating with pure refrigerants such as nitrogen or argon which usually exceed 100 atmospheres (atm). U.K. Patent 1,336,892 discloses a discharge operating pressure for a MR as low as 50 atm, while U.S. Pat. No. 5,337,572 discloses a cryogenic cycle based on a one-stage compressor having a discharge pressure of less than 25 atm. A low supply pressure allows the use of a variety of conventional industrial compressors in order to reduce the cost of the operating equipment and simplify the design of the coolers.

Mixed refrigerants are known to include low boiling point components such as nitrogen, argon and methane, as well as high boiling point components such as hydrocarbons, HC, or their chloro-fluoro derivatives, HCFC. A number of such refrigerant constituents at selected mole percentages have been combined to improve the efficiency of cryogenic cycles. In particular, U.S. Pat. No. 5,441,658 teaches the enrichment of a nitrogen based refrigerant with more than 30% propane to improve the Carnot efficiency of a refrigeration cycle operating at a low discharge pressure.

U.K. Patent 1,336,892 mentioned above also teaches the addition of 5 to 40% of neon, hydrogen or helium to reduce the refrigeration temperature. All these substances have a critical temperature below the refrigeration temperature Tr and that is why they are referred to as noncondensable components of the mixed refrigerant. Such components are selected to attain a cooling temperature below that attainable using only the original refrigerant. None of the known prior art teaches the use of these refrigerant components at refrigeration temperatures higher than that attainable with an original MR based on nitrogen, argon, methane or on a mixture thereof. Helium is selected from the various non-condensable components to illustrate the concepts of the invention as set forth below. However all the concepts presented using helium as an example are valid for hydrogen and neon as well.

Following traditional considerations, one would conclude that MRs which include helium have a lower specific cooling capacity, qr, measured in Joule/mole or Watt/mole/ min, than the same MRs without helium. Thus, one would be led to believe that the maximum possible value of the Carnot efficiency of a refrigeration cycle will be lower as well when helium is added to the MR.

For example, FIG. 1 shows data for nitrogen-hydrocarbon refrigerant compared to the same refrigerant which include different mole percentages of helium when the return pressure, P1, of the cycle, i.e. the pressure of the MR returning to the compressor from the cryostat, is taken between 0.1 and 0.3 MPa atm (1 to 3 atm). Conventional thinking would lead one to expect reduced specific cooling capacity, qr, when increasing the helium content in the mixture. For example, a helium content of 12% in the MR decreases both qr and the Carnot efficiency by 25 to 30% (FIG. 1). This is why conventional practice does not recommend the use of helium to provide refrigeration at temperatures which are attainable without the addition of He, $H_2$ or Ne.

SUMMARY OF THE INVENTION

The present invention has been developed to provide a method and mixed gas refrigerants which can produce more refrigeration than that attainable with existing cryogenic refrigeration systems at temperatures above the normal boiling points of low boiling point components, such as nitrogen and argon. This increase in cooling capacity is achieved by adding helium to the refrigerant blend and by simultaneously increasing the value of the return pressure of the refrigeration cycle.

Rather than blending the refrigerant components to reduce the refrigeration temperature, Tr, by adding helium to the blend, as is known, the present invention adds helium to an existing refrigerant blend in such a manner so as to increase the cooling capacity of the refrigeration system without changing the refrigeration temperature from that of the original blend. This is accomplished by increasing the value of the return pressure of the refrigeration system, P1, according to a predetermined relationship between the molar percent of helium added to the refrigerant blend and the original or prior return pressure value of the refrigeration cycle. Helium may be combined or replaced with either neon or hydrogen to achieve a similar result.

By increasing the cooling capacity of the mixed refrigerant by enrichment with helium, or another suitable gas having a critical temperature below Tr, such as neon or hydrogen, the stability and the tolerance of the refrigeration system are improved so as to accommodate greater changes in hydraulic pressure in the return line within the system. This in turn facilitates the maintenance of a more constant refrigeration temperature, Tr, over a wider range of corresponding hydraulic pressure drops within the system.

The invention is based on a closed throttle cycle refrigerator with a mixed refrigerant operating at refrigeration temperatures between 77K and 120K. An increase in the cooling capacity of the refrigerator is achieved by adding helium, hydrogen and/or neon and increasing the return pressure, P1, of the refrigerant so that the temperature, Tr, is the same as it was before adding helium to the refrigerant and without increasing P1.

For a given one stage compressor, the higher return pressure results in a higher flow rate. By adding helium, hydrogen and/or neon, the operating temperature, Tr, is reduced but the refrigerant throttle can then be opened further to return Tr to the same temperature as before adding helium. This increases the flow rate and the refrigeration capacity.

An unexpected benefit of adding helium or other noncondensable gases and simultaneously increasing the return pressure is an increase of an overall cooling capacity Qr of the system at the temperatures Tr which are attainable without these gases. This is an unpredictable result because of a complex interaction of the mixed refrigerant and the one stage compressor. Another unexpected benefit of adding helium and increasing the return pressure is that the system becomes less sensitive to pressure deviations in the low pressure side of the heat exchanger as well as in the return line of the system.

Another object of the invention is to provide a cryogenic mixed gas refrigerant containing helium or another noncondensable gas which is particularly adapted for use in a commercially available one-stage compressor.

Yet another object of the invention is to increase the temperature stability and tolerance of a cryogenic system with respect to pressure deviations in the return line by adding helium to a mixed refrigerant in such a manner that the refrigeration temperature, Tr, of the original blend of gas refrigerants is maintained the same after the addition of helium. This is accomplished by increasing the return pressure, Pl, of the refrigeration system according to a predetermined ratio between the content of helium in the mixed gas refrigerant and the value of Pl.

Broadly, the invention encompasses a closed throttle cycle refrigeration system for providing refrigeration at cryogenic temperatures Tr<120K using a mixed refrigerant which includes a first low boiling constituent such as nitrogen, argon, methane or a mixture thereof having a normal boiling temperature which is equal to or lower than the refrigeration temperature, and a second high boiling constituent such as one or more hydrocarbons or their chloro-fluoro derivatives which includes components having a normal boiling point higher than the refrigeration temperature.

In order to increase the overall cooling capacity at the refrigeration temperature attainable without noncondensable components such as neon, hydrogen, and helium and improve the tolerance of the system with respect to possible deviations in the pressure drop which may take place in the low pressure line, the mixed refrigerant is diluted with a third constituent which includes the noncondensable components in an amount not greater than 30 molar percent. At the same time, the return pressure of the refrigeration cycle must be increased in a way which provides the same refrigeration temperature attainable without the noncondensable third refrigerant constituent. That is, the return pressure is increased in a certain proportion to the content of the noncondensable components.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 1 shows calculated cooling capacity qr, w/mole/min (solid line) and Carnot efficiency (dashed line) of a throttle refrigerator working on refrigerants with different helium content as a function of the return pressure, Pl. Curve 1 represents a nitrogen-hydrocarbons blend without helium (nitrogen-methane-ethane-propane, 35/15/25/25), curve 2 represents the same blend diluted with 3% helium, curve 3 with 12% helium. Calculations were made for the ideal cycle assumptions, that is, a compressor having 100% efficiency, no pressure drop and zero minimum temperature difference in the heat exchangers.

FIG. 2 shows minimum and maximal refrigeration temperatures achievable with helium-nitrogen-hydrocarbons blends (same as FIG. 1) with different helium content. The left half of the Figure represents minimal cooling temperature (obtained with zero heat load) as a function of the return pressure. The right half of the Figure represents maximal cooling temperature (obtained with maximal possible heat load) as a function of the return pressure. The difference between minimal and maximal cooling temperatures is almost negligible for a helium-free blend and increases with higher helium content.

FIG. 3 shows cooling capacity of the throttle refrigerator at a given temperature (82K) as a function of the return pressure. High pressure is 20 atm. Dashed lines represent calculations for the operating cycle with an ideal compressor (volumetric efficiency equals 1), solid lines with real compressor characteristics. Circles correspond to the helium-free blend, curves 1,2 correspond to the blend with 3% helium, curves 3,4 with 12% of helium, curve 5 with 12% of helium but lower volumetric efficiency (Ve).

| Curves 1,3 | Ve = 1 |
| Curves 2,4 | Ve = 0.89 − 0.04 * Ph/Pl |
| Curve 5 | Ve = 0.5 − 0.04 * Ph/Pl |

Figure 3:
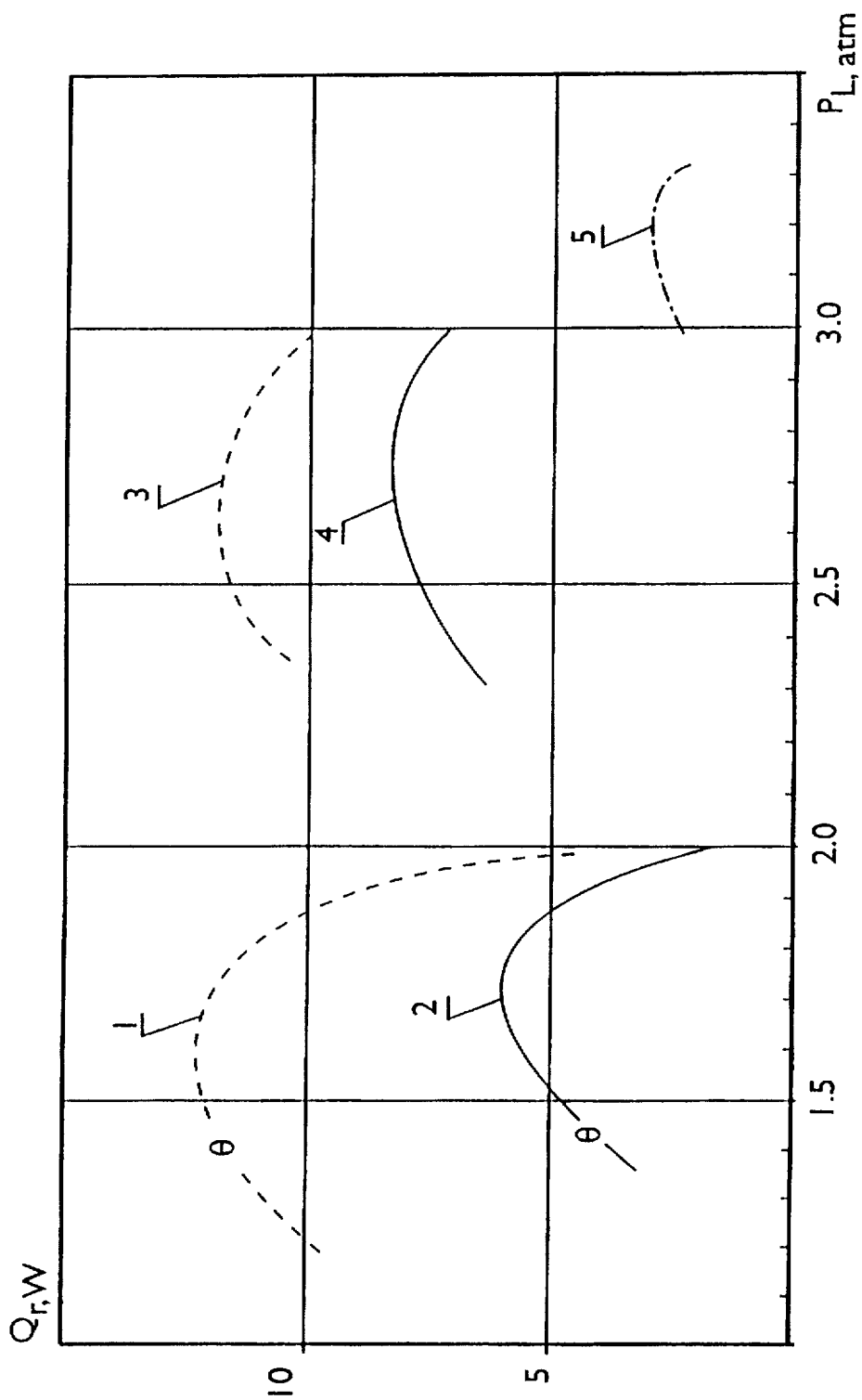
FIG. 3 is a plot of data curves depicting the influence of helium content on the overall cooling capacity, Qr, in a cryogenic refrigeration system using a rotary piston single-stage compressor.
Figure 4:
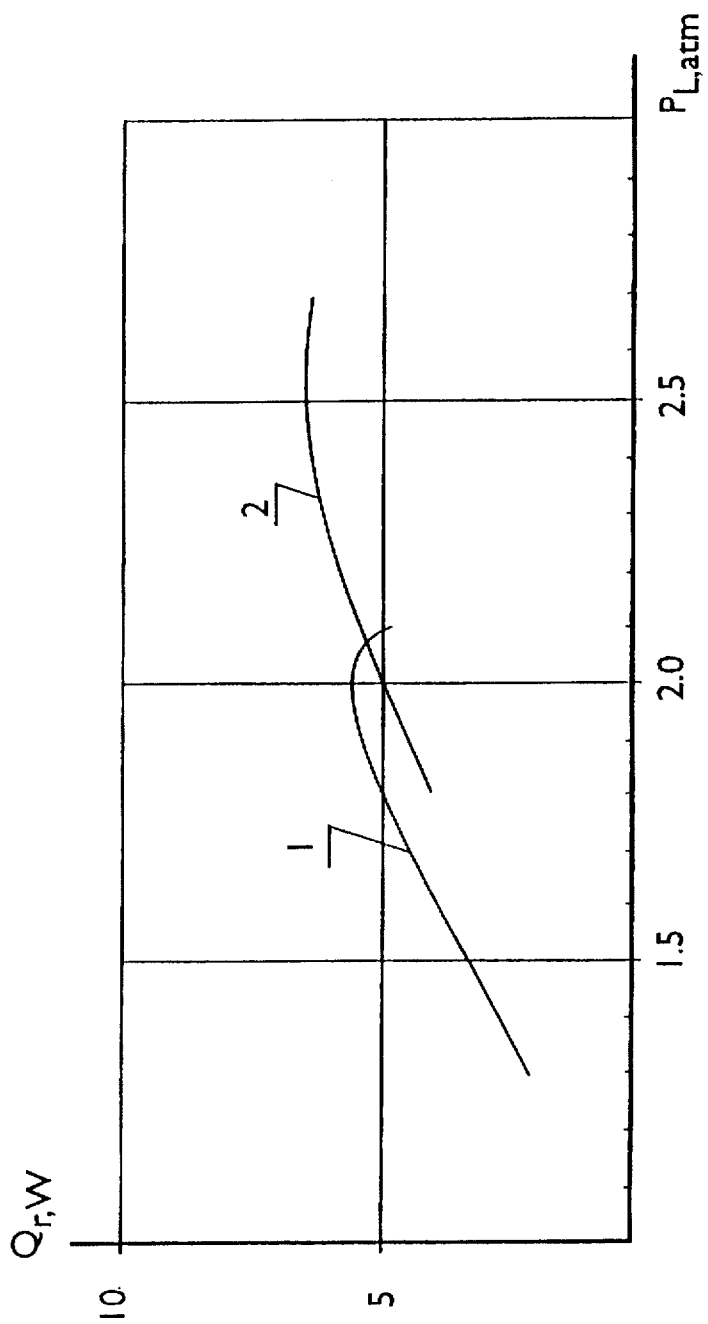

FIG. 4 is a plot of data curves similar to FIG. 3 depicting the refrigeration with a single-stage compressor as a function of Pl in a refrigeration cycle using argon based refrigerants. FIG. 4 shows the cooling capacity of the throttle refrigerator working at Tr=100K on argon based blend, Ar-R14-R13, as a function of the return pressure. Line 1 corresponds to the blend consisting of Ar-R14-R13 (40/30/30, mole %). Line 2 presents data for this blend diluted with 3% helium. The Figure shows that for this type of blend adding helium can also increase the cooling capacity.

Figure 5:
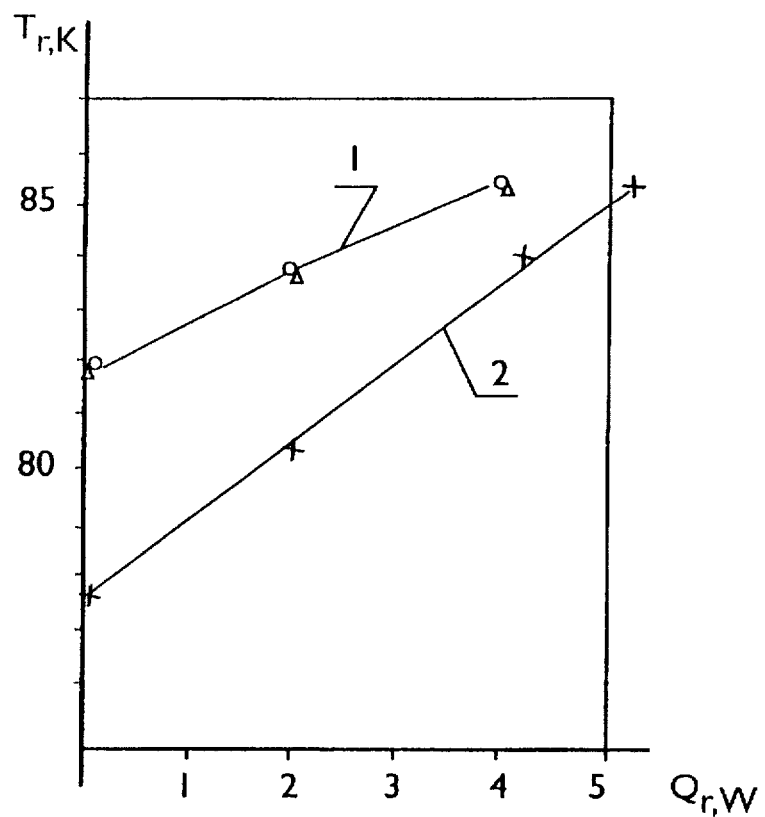

FIG. 5 presents experimental data depicting a refrigeration map Tr (Qr). Line 1 corresponds to the mixed refrigerant consisting of N2/CH4/C2H6/C3H8 (33/10/26/31, mole %). Line 2 corresponds to the mixed refrigerant diluted with helium : He/N2/CH4/C2H6/C3H8 (3/30/11/26/30, mole %).

DETAILED DESCRIPTION OF THE PREFERRED EMBODIMENTS

Figure 1:
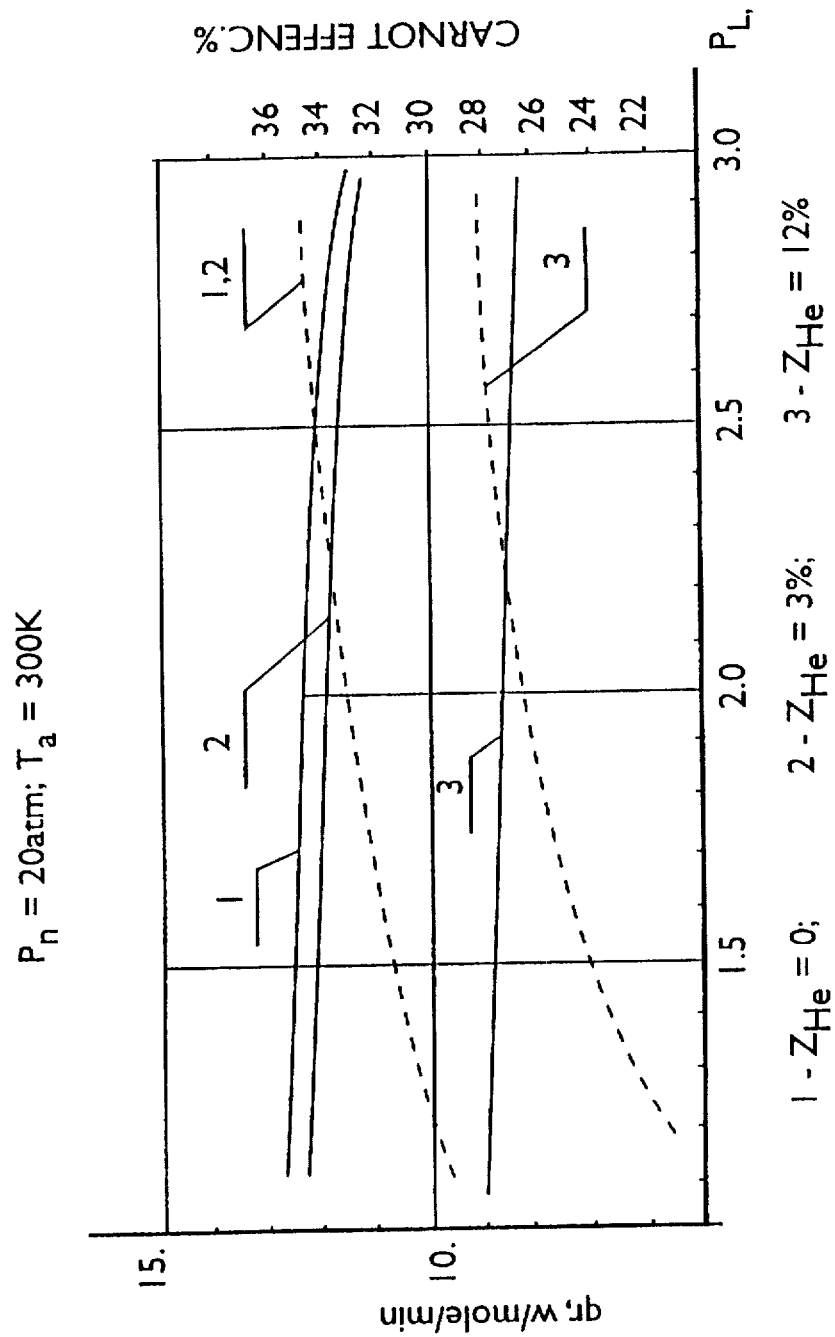
FIG. 1 is a plot of data representing specific cooling capacity, qr, and Carnot efficiency curves for nitrogen-hydrocarbon refrigerants containing helium as a function of the return pressure.
Figure 2:
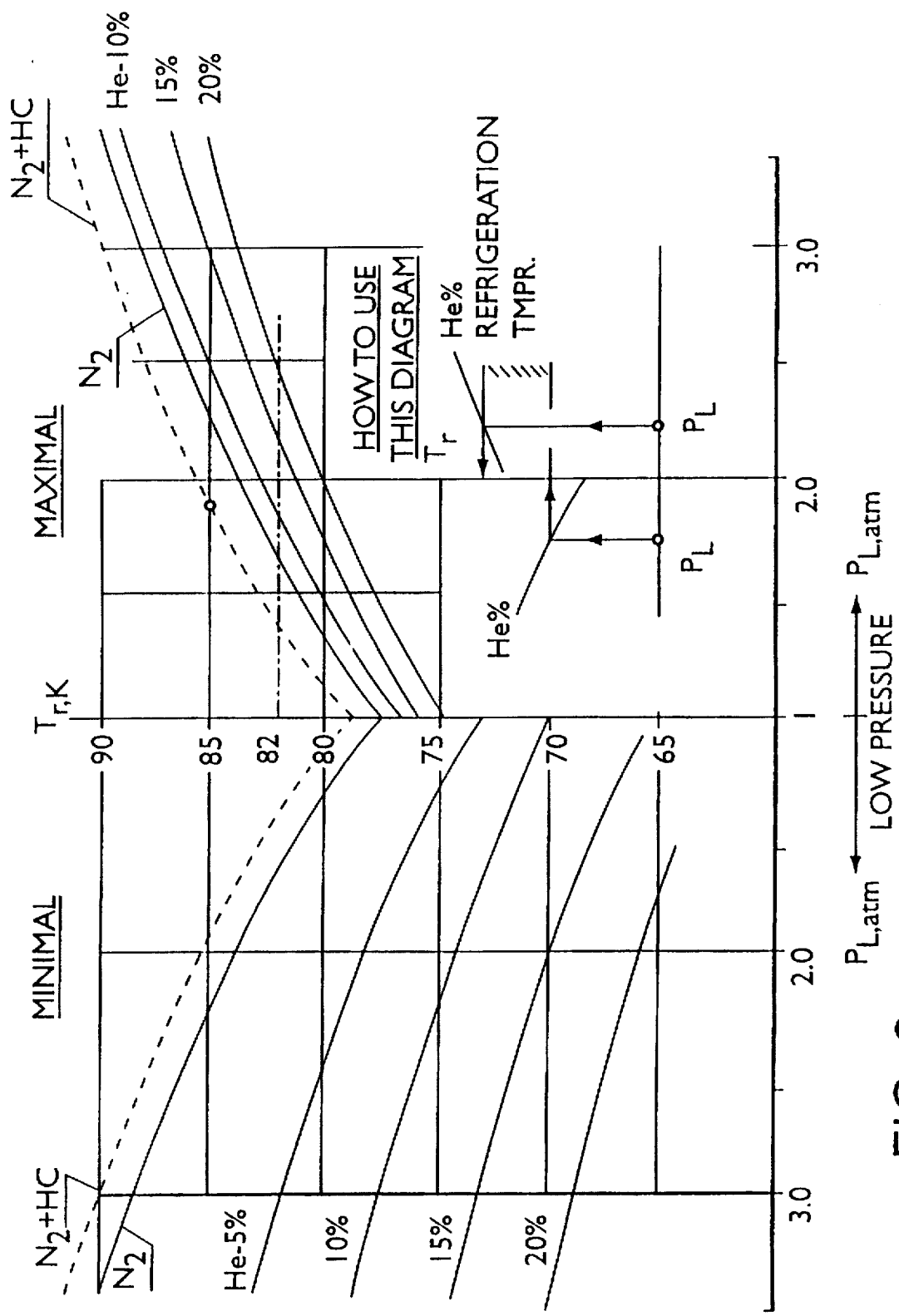
FIG. 2 is a plot of data curves representing the dependency of the refrigeration temperature, Tr, on the value of the return pressure, Pl, of the refrigeration cycle running on various mixed refrigerant blends based on nitrogen, methane and other hydrocarbons.

Nitrogen based blends of mixed gas refrigerants (Mrs) have been designed in accordance with the present invention to provide cryogenic refrigeration at temperatures in the range of 77 to 120K, that is, at temperatures higher than the normal boiling temperature of nitrogen. FIG. 2 shows how the refrigeration temperature, Tr, depends on the return pressure, Pl, in a cryogenic refrigeration system operating with nitrogen based MRs.

Theoretical and experimental investigations conducted during the development of the present invention show that throttling refrigerators such as the type employing a throttle cycle cryostat and an existing one-stage compressor display unexpected characteristics which contradict traditional thinking. By adding helium to a nitrogen or argon based refrigerant, the refrigeration cycle characteristics can be improved according to the invention, even at a Tr which is higher than that attainable with refrigerant blends without helium. In these cases, helium does not lower Tr as would normally be expected, provided that Pl is controlled in accordance with the invention. This control and maintenance of a constant Tr is possible because of the complex interactions of the thermodynamic properties of the individual refrigerant components and the operating characteristics of a one-stage compressor.

A main feature of a one-stage compressor is that its volumetric efficiency depends on the cycle pressure ratio Ph/Pl. The volumetric efficiency and the mass flow rate of a given compressor decrease with an increase in the pressure ratio. That is why in order to provide efficient refrigeration, U.S. Pat. No. 5,337,572, assigned to the same assignee as the present invention and incorporated herein by reference, advises the use of a compressor with a volumetric efficiency greater than 0.5 at Ph/Pl=5. However, this patent does not teach the use of helium as an ingredient of the MR.

FIG. 3 shows how the helium content influences the overall cooling capacity, Qr, of a cryogenic refrigeration system operating with a rotary piston compressor. The Mrs including helium provide greater Qr values compared to the Mrs without the helium as shown by circles. The overall cooling capacity, Qr, expressed in watts (w), is defined as the product: Qr=qr * G, where G is a certain mass flow rate taken for the particular compressor as a function of Ph/Pl. Even an enrichment of only 3% (molar) of helium, which is less than that recommended in U.K. Patent 1,336,892, is useful to increase the cooling capacity Qr at Tr=82K. That result is also supported by experimental data presented at FIG. 5. Similar results were obtained for argon based mixtures. These results are plotted in FIG. 4.

Increasing the overall cooling capacity, Qr, of the cycle based on a one-stage compressor by adding helium to a mixed refrigerant, as depicted in FIG. 3, is unexpected since it contradicts traditional considerations. It is well known that diluting a MR with helium leads to a reduction of the specific cooling capacity because of the negative throttle effect of helium. For example, the monograph "Cryogenic Systems" by R. Barron (Second Edition, Oxford University Press, New York, 1985) states "First, we see that the Joule-Thomson refrigerator cannot be used with neon, hydrogen or helium as the working medium, unless these gases are first precooled below their maximum inversion temperatures", (page 246, paragraph 5.3).

In this particular case, in order to provide better cooling capacity results, it is necessary to increase the return pressure, Pl, of the refrigerant gas returning to the compressor. This may be readily accomplished by further opening the refrigerator throttle valve. The helium content and the Pl value, as well as the volumetric efficiency of the compressor, must be in close mutual correlation to provide efficient refrigeration at the same refrigeration temperature, i.e. Tr=82K, provided previously with the same MR without the addition of helium.

The power consumption of the compressor increases with an increase in the low pressure value of the cycle, as shown in Table 1 presented below. That is why the high limit of the helium content is restricted by the power consumption of the compressor motor which should not exceed a nominal value. For example, the nominal power consumption of a rotary piston compressor having a displaced volume Vh=1 cfm is about 500 w.

Mixed refrigerants which include helium in the amounts specified in accordance with the invention are efficient for use in one-stage compressors having different volumetric efficiencies. Even the ideal compressor with a volumetric efficiency equal to 1 provides greater refrigeration capacity with a refrigerant fortified with helium as shown in FIG. 3.

A compressor having a very small volumetric efficiency, i.e. which is less than 0.5 at Ph/Pl=5, may provide refrigeration at Tr =82 K if the MR includes 12% of helium as depicted by line 3 in FIG. 3. Without adding helium to the blend refrigeration in this case would be impossible at 82K.

Another result of this investigation involves the stability of the refrigeration system with respect to providing refrigeration at a particular refrigeration temperature, Tr. If the MR does not include helium, then the refrigeration temperature, Tr, is in rigorous close correlation with the return pressure of the refrigeration cycle: Tr(Pl), as is shown in FIG. 2. Small variations in Pl result in immediate changes in Tr. At the same time, the hydraulic pressure drop, DPl, of the return line from a throttle cycle cryostat to the compressor may deviate within some limits because of deviations in system production tolerance. In practical applications, changing the hose locations connecting the compressor and the cryostat may cause a deviation in the pressure drop as well. That is why a cryogenic refrigerator must be adjustable to provide Tr values within certain limits.

Mixed refrigerants which include helium are more tolerant to deviations of the DPl. The tolerance is improved by increasing the helium content. For example, if DPl=0.3 atm (DPl=5 psi), then Pl=2.0 atm instead of 1.7 atm. In this case, the deviation in the cooling capacity may reach 300% when the MR includes 3% helium (FIG. 3, solid line 2). Increasing helium to 12% significantly improves the system tolerance. The Qr value deviates from the optimal by not more than 25 to 30% (line 4, FIG. 3). These deviations are 10 times smaller compared to a MR with 3% helium.

Experiments have been conducted to substantiate the high efficiency of the proposed method of increasing cooling capacity. Table 1 presents experimental data obtained with a throttle refrigerator based on a single-stage compressor working with blends of different compositions. To provide the same value of the refrigeration temperature, a throttle valve was manipulated manually.

TABLE 1

Experimental data from a refrigerator having a manually regulated throttle valve

| # | Blend Composition, mole % | | | | | Qr, | Tr, | Ph, | Pl, | Pcm, |
|---|---|---|---|---|---|---|---|---|---|---|
|   | He | N2 | CH4 | C2H4 | C3H8 | W | K | atm | atm | W |
| 1 | — | 41 | 10 | 22 | 28 | 2.0 | 83.8 | 20.7 | 1.3 | 361 |
| 2 | — | 33 | 10 | 26 | 31 | 2.0 | 83.2 | 20.7 | 1.15 | 350 |
| 3 | 3 | 30 | 11 | 26 | 30 | 4.0 | 84.0 | 22.0 | 2.9 | 451 |
| 4 | 4 | 40 | 18 | 18 | 20 | 3.0 | 81.0 | 19.4 | 2.6 | 496 |

The experimental blends included helium in an amount less than 5%, contrary to the prior art. Even a small amount of He improves the cooling capacity at the temperatures which are attainable without He. To provide the same values of Tr, the low pressure values Pl have been increased by opening the throttle valve. This allows for an increase in the mass flow rate of a one stage compressor that is illustrated by the measured power consumption Pcm of the compressor when adding He.

More experimental data with respect to Qr (Tr) dependence are presented in FIG. 5.

Adding helium is useful not only in systems with a regulated throttle but in systems having a nonregulated throttle like a capillary or an orifice as well. In this case, all the parameters of the refrigerator change by diluting the mixed refrigerant with helium. In particular, both the high pressure, Ph, and the low pressure, Pl, will be changed. However, the mass flow rate is increased so as to increase the overall cooling capacity of the system as well. Experimental data from the refrigerator having a capillary as a nonregulated throttle are given in Table 2.

TABLE 2

Experimental data from a refrigerator having a nonregulated throttle

| Components | Refrigerant Composition, % | | |
|---|---|---|---|
| | #1 | #2 | #3 |
| He | — | 5 | 10 |
| N2 | 39 | 34 | 37 |
| CH4 | 16 | 14 | 13 |
| C2H6 | 15 | 14 | 13 |
| C3H8 | 30 | 33 | 27 |

| Cool.Cap Or,W | Refrigeration Temperature Tr,K | | |
|---|---|---|---|
| 0 | 83.7 | 79.0 | 76.0 |
| 2 | 84.6 | 84.0 | 79.9 |
| 4 | 87.9 | 87.0 | 83.0 |
| 6 | 90.7 | 89.0 | 83.4 |
| 8 | — | 91.8 | 86.1 |
| 10 | — | — | 91.6 |
| Cmp.pwr.Pcm,W at Or = max | 415 | 27 | 450 |

Increasing of the cooling capacity, Qr, of such a system is due to an interaction of the refrigerator hardware and refrigerant properties.

There has been disclosed heretofore the best embodiment of the invention presently contemplated. However, it is to be understood that various changes and modifications may be made thereto without departing from the spirit of the invention. For example, other noncondensed gases such as hydrogen and/or neon may be used in combination with or instead of helium.

What is claimed is:

1. A method of increasing the cooling capacity of a closed throttle cycle refrigeration system operating with a one-stage compressor between a high pressure Ph and a low return pressure Pl controlled by a throttle device and using a mixed gas refrigerant to provide a predetermined refrigeration temperature Tr above 77K and below 120K, said mixed gas refrigerant comprising a first constituent having a normal boiling point equal to or less than Tr, and a second constituent having a normal boiling point greater than Tr, and wherein said method comprises:

adding to said mixed gas refrigerant a third constituent including at least one noncondensable gas at said predetermined refrigeration temperature, and adjusting the low pressure Pl of said system to maintain Tr at said predetermined temperature.

2. The method of claim 1, wherein said first constituent comprises nitrogen and said second constituent comprises hydrocarbons.

3. The method of claim 1, wherein said Pl is adjusted by adjusting said throttle device.

* * * * *